(12) United States Patent  
Uezu et al.

(10) Patent No.: US 11,640,831 B2  
(45) Date of Patent: May 2, 2023

(54) EVALUATION APPARATUS, TRAINING APPARATUS, METHODS AND PROGRAMS FOR THE SAME

(71) Applicant: NIPPON TELEGRAPH AND TELEPHONE CORPORATION, Tokyo (JP)

(72) Inventors: Yasufumi Uezu, Tokyo (JP); Sadao Hiroya, Tokyo (JP); Takemi Mochida, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/612,349

(22) PCT Filed: May 23, 2019

(86) PCT No.: PCT/JP2019/020500  
§ 371 (c)(1),  
(2) Date: Nov. 18, 2021

(87) PCT Pub. No.: WO2020/235089  
PCT Pub. Date: Nov. 26, 2020

(65) Prior Publication Data  
US 2022/0270635 A1 Aug. 25, 2022

(51) Int. Cl.  
*G10L 25/60* (2013.01)  
*G10L 15/06* (2013.01)  
(Continued)

(52) U.S. Cl.  
CPC ............ *G10L 25/60* (2013.01); *G10L 15/063* (2013.01); *G10L 21/003* (2013.01);  
(Continued)

(58) Field of Classification Search  
CPC ..... G10L 21/00; G10L 21/003; G10L 21/013; G10L 25/60  
See application file for complete search history.

(56) References Cited

U.S. PATENT DOCUMENTS

| | | | |
|---|---|---|---|
| 6,231,500 B1* | 5/2001 | Kehoe ...................... | A61F 5/58 600/23 |
| 2006/0122826 A1* | 6/2006 | Jiang ........................ | A61F 5/58 704/205 |

(Continued)

OTHER PUBLICATIONS

Necsulescu et al., "Subject-in-the-loop system for auditory feedback based voice retraining." 2011 IEEE International Symposium on Medical Measurements and Applications. IEEE. (Year: 2011).*

(Continued)

*Primary Examiner* — Samuel G Neway

(57) ABSTRACT

An evaluation device applies a lowpass filter with a cutoff frequency being a first predetermined value or a second predetermined value greater than the first predetermined value with or without change of feedback formant frequencies which are formant frequencies of a picked-up speech signal, converts the picked-up speech signal, feeds back the converted speech signal to a subject, and includes an evaluation unit that calculates a compensatory response vector by using pickup formant frequencies which are formant frequencies of a speech signal acquired by picking up an utterance made by the subject while feeding back a speech signal that has been converted with change of the feedback formant frequencies to the subject, and pickup formant frequencies which are formant frequencies of a speech signal acquired by picking up an utterance made by the subject while feeding back a speech signal that has been converted without change of the feedback formant frequencies to the subject, and determines an evaluation based on a compensatory response vector for each cutoff frequency.

9 Claims, 9 Drawing Sheets

(51) Int. Cl.
*G10L 21/0364* (2013.01)
*G10L 21/14* (2013.01)
*G10L 25/15* (2013.01)
*G10L 21/003* (2013.01)
*G10L 21/013* (2013.01)

(52) U.S. Cl.
CPC ........ *G10L 21/013* (2013.01); *G10L 21/0364* (2013.01); *G10L 21/14* (2013.01); *G10L 25/15* (2013.01)

(56) References Cited

U.S. PATENT DOCUMENTS

2011/0257464 A1* 10/2011 Kehoe ................ A61F 5/58
600/23
2022/0270635 A1* 8/2022 Uezu ................ G10L 21/14

OTHER PUBLICATIONS

Villacorta et al., "Sensorimotor adaptation to feedback perturbations of vowel acoustics and its relation to perception." The Journal of the Acoustical Society of America 122.4 (Year: 2007).*
Garber et al. (1980) "The effects of feedback filtering on speaker intelligibility" Journal of Communication Disorders, vol. 13, No. 4, pp. 289-294.
Houde et al. (1998) "Sensorimotor adaptation in speech production" Science, vol. 279, pp. 1213-1216.

* cited by examiner

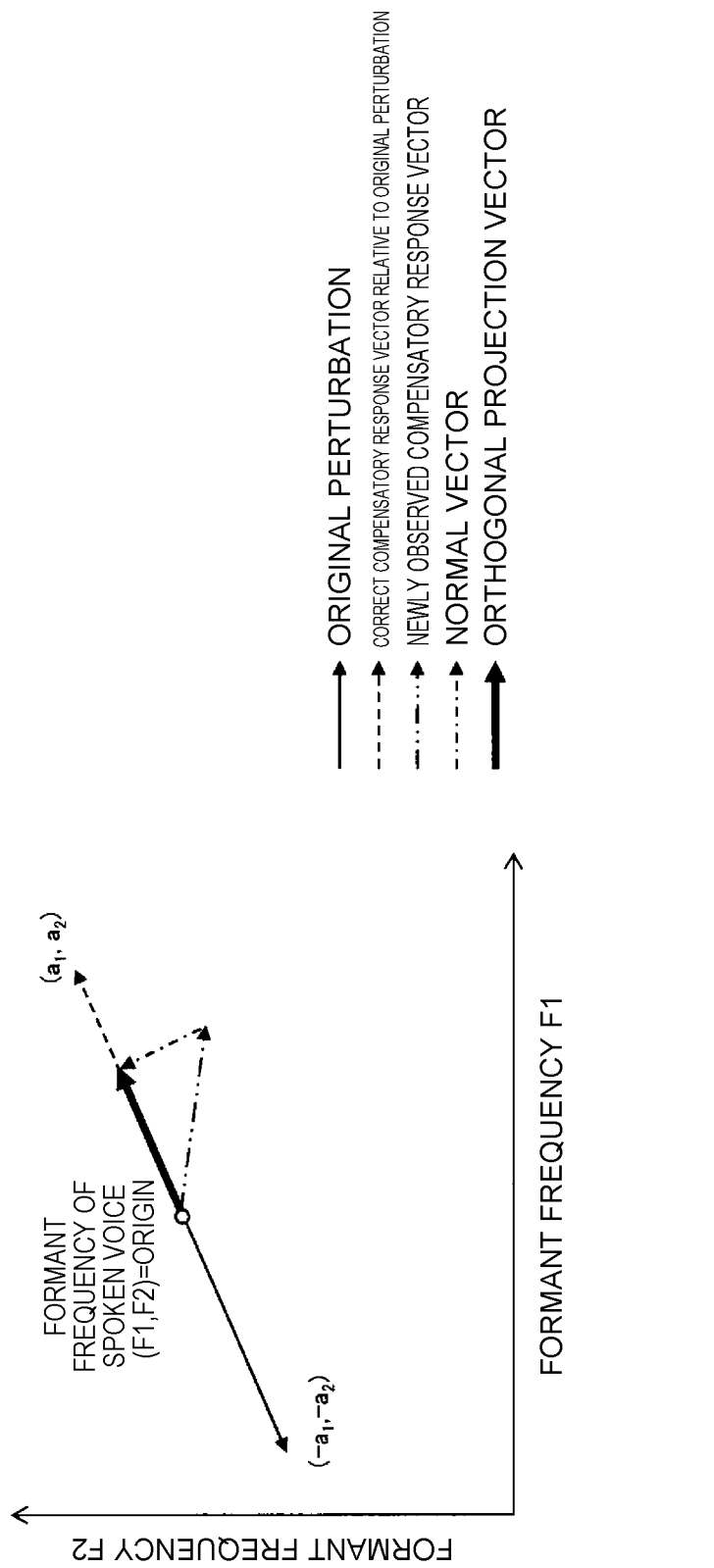

EVALUATION APPARATUS, TRAINING APPARATUS, METHODS AND PROGRAMS FOR THE SAME

CROSS-REFERENCE TO RELATED APPLICATIONS

This application is a U.S. National Stage Application filed under 35 U.S.C. § 371 claiming priority to International Patent Application No. PCT/JP2019/020500, filed on 23 May 2019, the disclosure of which is hereby incorporated herein by reference in its entirety.

TECHNICAL FIELD

The present invention relates to an evaluation device for evaluating perception characteristics of a subject and a training device for training utterance of a subject.

BACKGROUND ART

A person generates utterances while monitoring speech sound he/she uttered in real time. It is known that in doing so, utterance generation is affected when the person's voice being auditorily fed back is filtered with a lowpass filter having a cutoff frequency of 2 kHz or lower (Non-Patent Literature 1).

In Non-Patent Literature 2, a subject produces utterance while listening to speech sound he/she has uttered though a headphone. It is known that when formant frequency information of speech sound to be fed back is converted in such a situation, a compensatory response in which the subject tries to speak with formant frequencies lowered or raised in a direction of canceling the change is observed.

CITATION LIST

Non-Patent Literature

Non-Patent Literature 1: S. R. Garber, G. M. Siegel and H. L. Pick, Jr, "The effects of feedback filtering on speaker intelligibility", J. Communication Disorders, vol. 13, p. 289-294. 1980.

Non-Patent Literature 2: J. F. Houde and M. I. Jordan, "Sensorimotor adaptation in speech production", Science, vol. 279, issue 5354, pp. 1213-1216. 1998.

SUMMARY OF THE INVENTION

Technical Problem

A process of a human utterance generation could be affected so as to attain improvement in speech and the like by application of the lowpass filter from Non-Patent Literature 1 or the approach of modified auditory feedback according to Non-Patent Literature 2. However, it is not clear specifically what kind of feedback enables what kind of improvement and there is no known approach to applying it to utterance training.

An object of the present invention is to provide an evaluation device for evaluating perception characteristics of a subject, a training device for training the utterance of a subject, methods for them and a program that utilize relation that holds between a cutoff frequency and a compensatory response of utterance observed.

Means for Solving the Problem

To attain the object, an evaluation device according to an aspect of the present invention includes: a signal analysis unit that analyzes a picked-up speech signal and determines a first formant frequency and a second formant frequency; a conversion unit that applies a lowpass filter with a cutoff frequency being a first predetermined value or a second predetermined value greater than the first predetermined value with or without change of feedback formant frequencies which are formant frequencies of the picked-up speech signal, and converts the picked-up speech signal; a feedback unit that feeds back the converted speech signal to a subject; and an evaluation unit that calculates a compensatory response vector by using pickup formant frequencies which are formant frequencies of a speech signal acquired by picking up an utterance made by the subject while feeding back a speech signal that has been converted with change of the feedback formant frequencies to the subject, and pickup formant frequencies which are formant frequencies of a speech signal acquired by picking up an utterance made by the subject while feeding back a speech signal that has been converted without change of the feedback formant frequencies to the subject, and determines an evaluation based on a compensatory response vector for each cutoff frequency.

To attain the object, an evaluation device according to a further aspect of the present invention includes: a signal analysis unit that analyzes a picked-up speech signal and determines a first formant frequency and a second formant frequency; a conversion unit that applies a lowpass filter with a cutoff frequency being a first predetermined value or a second predetermined value greater than the first predetermined value to the picked-up speech signal and converts the picked-up speech signal; a feedback unit that feeds back the converted speech signal to a subject; and an evaluation unit that determines an evaluation based on a difference between each of pickup formant frequencies which are formant frequencies of a speech signal acquired by picking up an utterance made by the subject while feeding back a speech signal that has been converted by application of a lowpass filter with the cutoff frequency being a first predetermined value to the subject, and each of pickup formant frequencies which are formant frequencies of a speech signal acquired by picking up an utterance made by the subject while feeding back a speech signal that has been converted by application of a lowpass filter with the cutoff frequency being a second predetermined value to the subject.

To attain the object, a training device according to a further aspect of the present invention includes: a signal analysis unit that analyzes a picked-up speech signal and determines a first formant frequency and a second formant frequency; a conversion unit that applies a lowpass filter with a cutoff frequency being a first predetermined value with or without change of feedback formant frequencies which are formant frequencies of the picked-up speech signal, and converts the picked-up speech signal; a feedback unit that feeds back the converted speech signal to a subject; and an evaluation unit that calculates a compensatory response vector by using pickup formant frequencies which are formant frequencies of a speech signal acquired by picking up an utterance made by the subject while feeding back a speech signal that has been converted with change of the feedback formant frequencies to the subject, and pickup formant frequencies which are formant frequencies of a speech signal acquired by picking up an utterance made by the subject while feeding back a speech signal that has been converted without change of the feedback formant frequencies to the subject, and determines an evaluation based on the compensatory response vector and a correct compensatory response vector. Whether to make the subject conduct utterance training with a same utterance content repeatedly or not is determined based on a relation of magnitude between the evaluation and a predetermined threshold.

To attain the object, a training device according to a further aspect of the present invention includes: a signal analysis unit that analyzes a picked-up speech signal and determines a first formant frequency and a second formant frequency; a conversion unit that applies a lowpass filter with a cutoff frequency being a first predetermined value or a second predetermined value greater than the first predetermined value to the picked-up speech signal and converts the picked-up speech signal; a feedback unit that feeds back the converted speech signal to a subject; and an evaluation unit that determines an evaluation based on pickup formant frequencies which are formant frequencies of a speech signal acquired by picking up an utterance made by the subject while feeding back a speech signal that has been converted by application of the first predetermined value as the cutoff frequency to the subject, and pickup formant frequencies which are formant frequencies of a speech signal acquired by picking up an utterance made by the subject while feeding back a speech signal that has been converted by application of the second predetermined value as the cutoff frequency to the subject. Whether to make the subject conduct utterance training with a same utterance content repeatedly or not is determined based on a relation of magnitude between the evaluation and a predetermined threshold.

Effects of the Invention

The present invention has effects of being able to evaluate the perception characteristics of a subject and to train the subject's utterance by utilizing the relation that holds between the cutoff frequency and the compensatory response of an utterance observed.

BRIEF DESCRIPTION OF DRAWINGS

FIG. 9 shows an exemplary display on a display unit.

DESCRIPTION OF EMBODIMENTS

Figure 1:
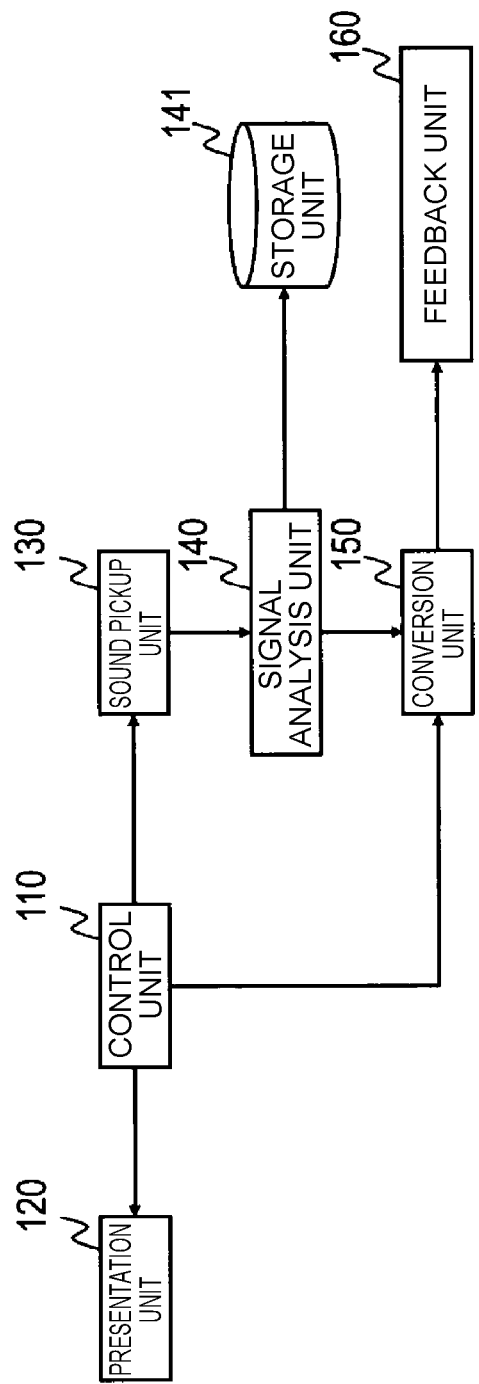
FIG. 1 is a functional block diagram of an experimental device.

Embodiments of the present invention are described below. In drawings used in the following description, components having the same function or steps that perform the same processing are given the same reference numerals and overlapping descriptions are omitted. In the following description, symbols used in text such as "^" and "→" are supposed to be indicated right above the immediately following letter, but are indicated immediately before the letter of interest due to limitation in text notation. In expressions, these symbols are indicated at their proper positions. Also, processing that is performed separately for each of elements of a vector or a matrix shall be applied to all of the elements of the vector or the matrix unless otherwise specified.

<<Principle of the Invention>>

The present invention has been made on discovery of a natural law that there is a certain law between a cutoff frequency and a compensatory response of an utterance observed when a speech signal to which a lowpass filter has been applied is auditorily fed back. Thus, the relation that holds between the cutoff frequency and the compensatory response of an utterance observed, which lies behind the discovery, and experiment results that support it are described first.

<<Experimental Device 100>>

Figure 2:
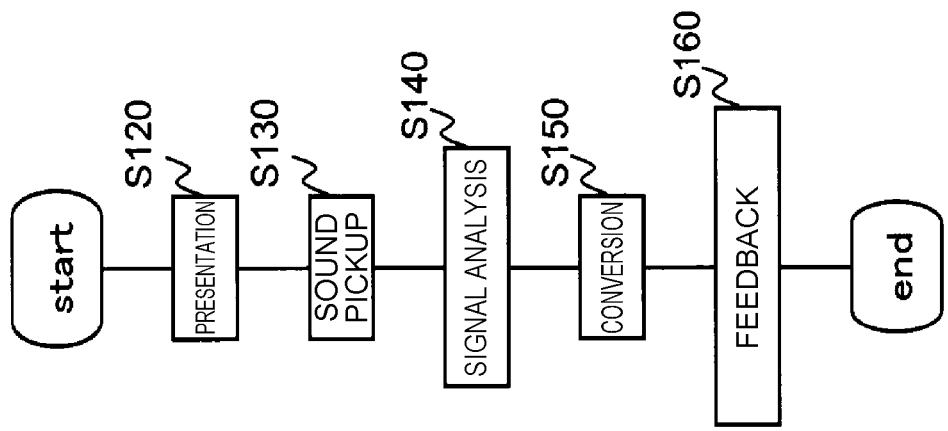
FIG. 2 shows an example of a processing flow of the experimental device.

FIG. 1 is a functional block diagram of an experimental device 100 used for experiments and FIG. 2 shows an example of its processing flow.

The experimental device 100 includes a control unit 110, a presentation unit 120, a sound pickup unit 130, a signal analysis unit 140, a storage unit 141, a conversion unit 150 and a feedback unit 160.

The experimental device 100 presents an utterance content that a subject should utter to the subject via the presentation unit 120, picks up speech sound uttered by the subject via the sound pickup unit 130, and feeds back a picked-up speech signal to the subject via the feedback unit 160 with or without conversion. The subject produces an utterance corresponding to the presented utterance content while listening to the speech sound being fed back.

The experimental device, and an evaluation device and a training device to be discussed later are special devices structured by loading of special programs into a known or dedicated computer having a central processing unit (CPU), main storage (random access memory or RAM) and the like, for example. The experimental device, the evaluation device and the training device execute various processing under control of the central processing unit, for example. Data input to the experimental device, the evaluation device and the training device and data resulting from processing are stored in the main storage, for example, and the data stored in the main storage is read into the central processing unit as necessary to be used in other processing. Processing units of the experimental device, the evaluation device and the training device may at least partially consist of hardware such as integrated circuitry. Storage units provided in the experimental device, the evaluation device and the training device can be composed of main storages such as RAM (random access memory), or middleware such as a relational database or a key value store, for example. However, the storage units may not necessarily be provided within the experimental device, the evaluation device and the training device; they may be composed of auxiliary storage devices formed from a hard disk or an optical disk or a semiconductor memory element such as flash memory and provided outside the experimental device, the evaluation device and the training device.

The individual components are described below.

[Control Unit 110]

The control unit 110 outputs control signals to the presentation unit 120 and the sound pickup unit 130 such that an utterance content that the subject should utter is determined and presented by the presentation unit 120 and also speech sound uttered by the subject is picked up by the sound pickup unit 130. An "utterance content that the subject should utter" is a phoneme, a sentence and the like, and is prepared before an experiment or evaluation and training, which are discussed later.

The control unit 110 also determines what kind of conversion is to be performed in the conversion unit 150 and outputs indication information indicating the determined content to the conversion unit 150. The content indicated by the indication information also includes a case of not performing conversion. The indication information is information that includes at least either of a cutoff frequency value and a flag indicating whether to convert formant frequencies or not. A timing at which the control unit 110 outputs indication information can be any timing that can specify what kind of conversion should be performed at a certain time. For example, the control unit 110 may be configured to output indication information every time the content of indication information is changed or to output it per unit of processing (e.g., frame).

The indication information may be input from an external input device or may be determined or selected based on a predefined rule.

[Presentation Unit 120]

The presentation unit 120 takes a control signal as input and presents the utterance content that the subject should utter to the subject visually or auditorily through a display or a speaker, earphones and the like according to the control signal (S120).

The subject produces an utterance in accordance with information presented by the presentation unit 120.

[Sound Pickup Unit 130]

The sound pickup unit 130 is a microphone or the like for picking up speech sound uttered by the subject. The sound pickup unit 130 takes a control signal as input, and according to the control signal, picks up speech sound uttered by the subject (S130), filters the picked-up speech signal using a lowpass filter with a cutoff frequency of 8 kHz and outputs the filtered speech signal to the signal analysis unit 140. This lowpass filter is for avoiding aliasing and may be applied as required.

[Signal Analysis Unit 140]

The signal analysis unit 140 takes as input the speech signal filtered at the sound pickup unit 130, and converts the speech signal into a frequency domain representation. Then, the signal analysis unit 140 analyzes the speech signal in frequency domain to determine a first formant frequency F1 and a second formant frequency F2 (S140), and stores them in the storage unit 141 in association with a time of pickup of the speech signal. For example, the time of pickup may be acquired from an internal clock, an NTP server or the like when the sound pickup unit 130 or the signal analysis unit 140 accepts the speech signal. The signal analysis unit 140 also outputs the speech signal in frequency domain to the conversion unit 150. For calculation of formant frequencies, any calculation method may be used. For example, an approach of Reference Literature 1 may be used.

[Reference Literature 1] V. M. Villacorta, J. S. Perkell and F. H. Guenther, "Sensorimotor adaptation to feedback perturbations of vowel acoustics and its relation to perception," J. Acoust. Soc. Am., 122(4), 2306-2319 (2007).

[Conversion Unit 150]

The conversion unit 150 takes as input the speech signal in frequency domain and the indication information from the control unit 110, further converts the speech signal in frequency domain based on the indication information (S150), and outputs it to the feedback unit 160. Since the content indicated by the indication information also includes a case of not performing conversion as mentioned above, the speech signal in frequency domain is output to the feedback unit 160 without conversion in some cases.

The indication information is information that includes at least either of a cutoff frequency value and a flag indicating whether to convert formant frequencies or not.

(i) When the indication information includes only a cutoff frequency Fc, a lowpass filter that removes frequency components equal to or higher than the cutoff frequency Fc is applied to the input speech signal to obtain a speech signal with high frequency components removed, and the speech signal is output to the feedback unit 160.

(ii) When the indication information includes only a flag indicating that the formant frequencies F1 and F2 are to be converted, a speech signal generated by converting the formant frequencies F1 and F2 of the input speech signal is output to the feedback unit 160. For example, a speech signal with an increased F1 and a decreased F2 is output to the feedback unit 160. For conversion of the formant frequencies F1 and F2, any conversion method may be used. For example, Non-Patent Literature 2 is used for conversion.

(iii) When the indication information includes both the cutoff frequency Fc and a flag indicating that the formant frequencies F1 and F2 are to be converted, the conversion unit 150 first converts the formant frequencies F1 and F2 of the input speech signal. Then, the conversion unit 150 applies a lowpass filter that removes frequency components equal to or higher than the cutoff frequency Fc to the speech signal resulting from the conversion to obtain a speech signal with high frequency components removed, and outputs the speech signal to the feedback unit 160.

[Feedback Unit 160]

The feedback unit 160 is a headphone and the like worn by the subject, takes a speech signal converted by the conversion unit 150 as input and feeds it back to the subject by reproducing it (S160).

<<Experiment>>

Using the experimental device 100, phonation of the subject is auditorily fed back in real time. As mentioned above, the subject produces an utterance corresponding to the presented utterance content while listening to the speech sound being fed back. In doing so, by making the subject pronounce a predetermined phoneme or sentence repeatedly and giving auditory feedback while changing indication information, information on the compensatory response of formant frequencies for each cutoff frequency is collected.

For cutoff frequencies Fc of 3 kHz, 4 kHz and 8 kHz, the formant frequencies of speech signals picked up by the sound pickup unit 130 (hereinafter also called pickup formant frequencies) when the formant frequencies of the speech signal being fed back (hereinafter also called feedback formant frequencies) are changed and when they are not changed are observed.

For the pickup formant frequencies thus obtained, the compensatory response is computed. A compensatory response is a pickup formant frequency $F_i^A$ of speech sound uttered by the subject when the feedback formant frequencies are converted with the indication information of the conversion unit 150 minus a pickup formant frequency $F_i^B$ of speech sound uttered by the subject when the feedback formant frequencies are not converted with the indication information of the conversion unit 150. For example, a compensatory response $(\hat{F}_i)$ for the i-th formant frequency is determined by the expression below:

$$(\hat{F}_i) = F_i^A - F_i^B$$

Figure 3:
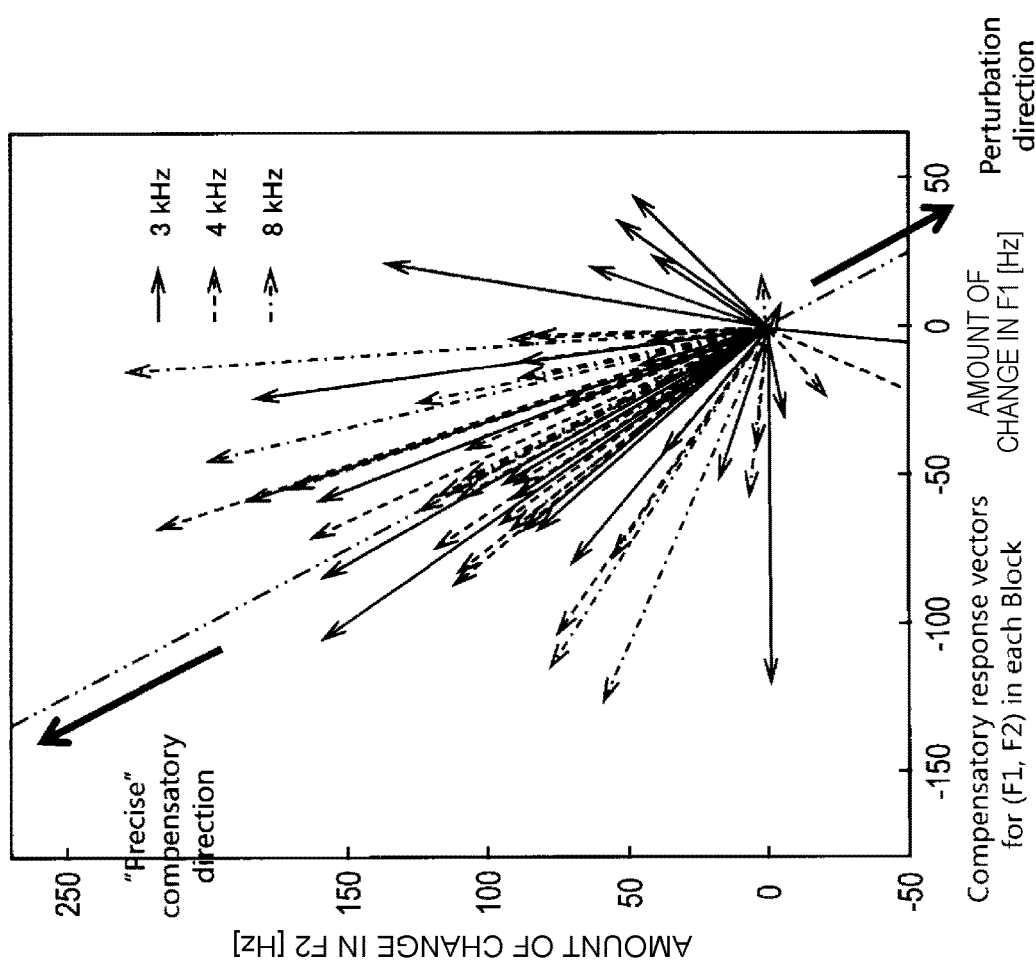
FIG. 3 shows a plot of compensatory response vectors.

A plot of compensatory response vectors is shown in FIG. 3, where the horizontal axis is a compensatory response $\hat{F}_1$ (amount of change) of the first formant frequency F1 and the vertical axis is a compensatory response $\hat{F}_2$ (amount of change) of the second formant frequency F2 thus obtained.

In the experiment, the feedback formant frequencies are changed in the same direction (the direction of increasing F1 and decreasing F2) for all the cutoff frequencies. Accordingly, the compensatory response of the pickup formant frequencies is supposed to be indicated in a direction of lower F1 and higher F2, that is, as a vector oriented in upper left direction along the double-dot dashed line in FIG. 3. However, as can be seen from the result of FIG. 3, the compensatory response vectors for the cutoff frequencies of 3 kHz and 4 kHz include ones oriented in directions different from upper left, having large variations. By contrast, for the cutoff frequency of 8 kHz, the vectors are substantially oriented in upper left direction, having low variations.

Figure 4:
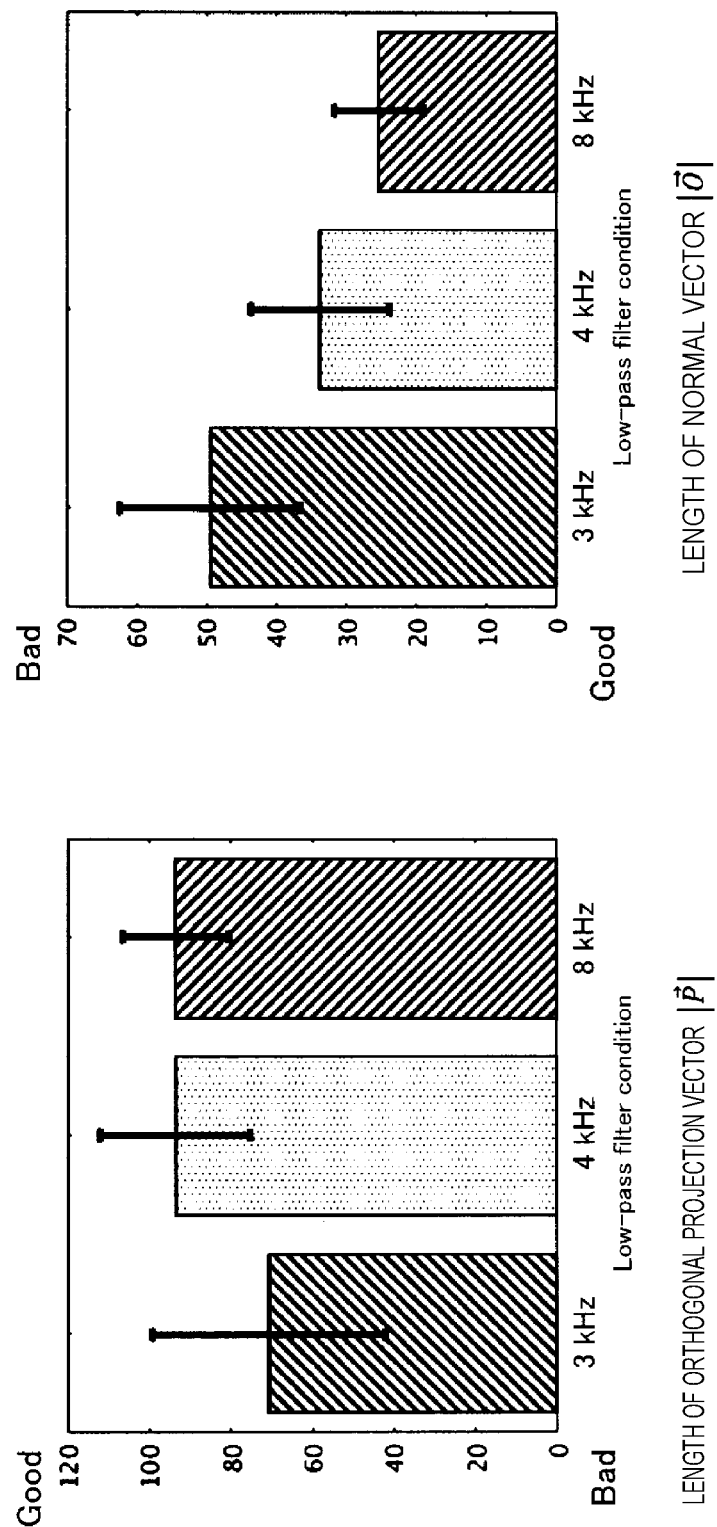
FIG. 4 shows average values of magnitudes of orthogonal projection vectors of compensatory response vectors resulting from an experiment onto a correct compensatory response vector and magnitudes of normal vectors from the compensatory response vectors resulting from the experiment to the correct compensatory response vector.

FIG. 4 shows average values of magnitudes of orthogonal projection vectors of compensatory response vectors resulting from the experiment (the compensatory response vectors when a lowpass filter is applied) onto a correct compensatory response vector (here, a vector of the same magnitude in an opposite direction to a vector corresponding to original perturbation), and magnitudes of normal vectors from the compensatory response vectors resulting from the experiment to the correct compensatory response vector. Perturbation indicates a direction and a magnitude by which the feedback formant frequencies are moved when formant frequency information for the speech sound to be fed back is converted. A magnitude $|\to P|$ of an orthogonal projection vector $\to P = (p_1, p_2)$ of a compensatory response vector $\to F = (\hat{F}_1, \hat{F}_2)$ resulting from the experiment onto the correct compensatory response vector $\to A = (a_1, a_2)$ is computed by the expression below, for example.

$$|\vec{P}| = \frac{\vec{F} \cdot \vec{A}}{|\vec{A}|} = \frac{\hat{F}_1 a_1 + \hat{F}_2 a_2}{\sqrt{a_1^2 + a_2^2}} \quad \text{[Math. 1]}$$

The magnitude $|\to P|$ of the orthogonal projection vector is a magnitude of an amount of overall compensation for the formant frequencies. A greater magnitude $|\to P|$ of the orthogonal projection vector means a larger amount of overall compensation for the formant frequencies, and it can be said good compensatory response is made.

A magnitude $|\to O|$ of a normal vector $\to O = (o_1, o_2)$ of the compensatory response vector $\to F = (\hat{F}_1, \hat{F}_2)$ resulting from the experiment to the correct compensatory response vector $\to A = (a_1, a_2)$ is computed by the expression below, for example:

$$|\vec{O}| = \sqrt{|\vec{F}|^2 - |\vec{P}|^2} = \sqrt{\left(\hat{F}_1^2 + \hat{F}_2^2\right) - \left(\frac{\hat{F}_1 a_1 + \hat{F}_2 a_2}{\sqrt{a_1^2 + a_2^2}}\right)^2} \quad \text{[Math. 2]}$$

The magnitude $|\to O|$ of the normal vector is a magnitude of an overall compensation error for the formant frequencies. A smaller magnitude $|\to O|$ of the normal vector means a smaller overall compensation error for the formant frequencies, and it can be said good compensatory response is made.

It can be seen also from the result of FIG. 4 that the magnitude $|\to P|$ of the orthogonal projection vector for the cutoff frequency of 3 kHz is smaller than in the other cases and the magnitude $|\to O|$ of the normal vector tends to become smaller as the cutoff frequency is greater.

From these results, it is understood that a lower cutoff frequency of the lowpass filter results in a worse compensatory response of the formant frequencies and larger variations thereof.

In general, the formant frequencies are related to the shape of vocal tract and are different from person to person, but the formant frequencies are of close values when the phonemic sound being pronounced is the same. Also, first to third formants (F1 to F3), or low formant frequencies, in particular include much information necessary for perceiving pronunciation (phonemic sound), and a region from 4 kHz and less than 8 kHz is considered to contain many characteristics that are dependent on naturalness as speech sound and the individual speaker (voice identity) (Reference Literature 2). Reference Literature 2 suggests that personality of voice is much contained in higher frequencies of speech sound and these higher frequency components are utilized in perception of voice identity. Thus, it can be said that phonemic sound and voice identity can be sufficiently perceived when the cutoff frequency of the lowpass filter is 8 kHz, whereas voice identity is lost with the cutoff frequency of 3 kHz or 4 kHz.

[Reference Literature 2] S. Hayakawa and F. Itakura, "Text-dependent speaker recognition using the information in the higher frequency", in Proc. of I CASSP, pp. 137-140 (1994).

The result in FIG. 3 indicates that the compensatory response of the formant frequencies varies when voice identity becomes difficult to perceive due to lowering of the cutoff frequency of the speech sound being fed back. This can also be considered to indicate that a person learns utterance using features of his/her voice identity, and consequently, he/she can no longer make correct utterances once voice identity becomes unperceivable.

First Embodiment

A first embodiment describes an evaluation device for evaluating the perception characteristics of a subject by employing the foregoing findings.

As shown by the experiment results above, a lower cutoff frequency statistically leads to larger variations in the compensatory response of the formant frequencies. It is estimated that for a person who better recognizes the features of speech signals in high frequencies (4 kHz to 8 kHz bands) (voice identity), variations in the compensatory response are rendered larger when information in the high frequency bands is removed through a lowpass filter. That is to say, there seems to be a positive correlation between the magnitude of variations in the compensatory response when information in the high frequency bands is removed and ability to recognize voice identity. In other words, the larger the variations in the compensatory response are when information in the high frequency bands is removed, the ability to recognize voice identity is considered to be higher. Here, the ability to recognize voice identity can also be said as ability to distinguish between one's own voice identity and others' voice. The evaluation device in the first embodiment uses this correlation to evaluate the perception characteristics of a subject. The perception characteristics as referred to herein is the ability to recognize voice identity.

Figure 5:
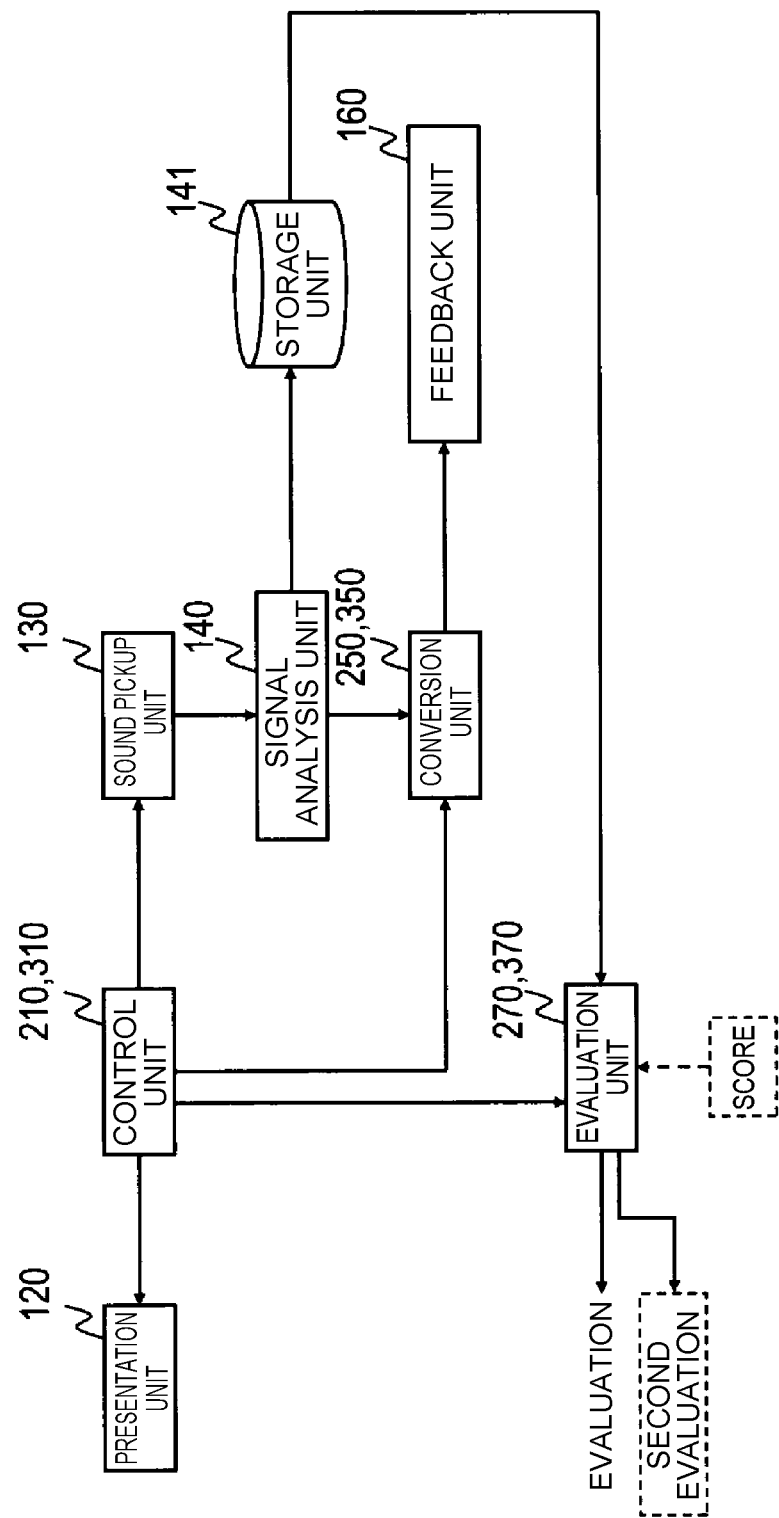
FIG. 5 is a functional block diagram of an evaluation device according to first and second embodiments.
Figure 6:
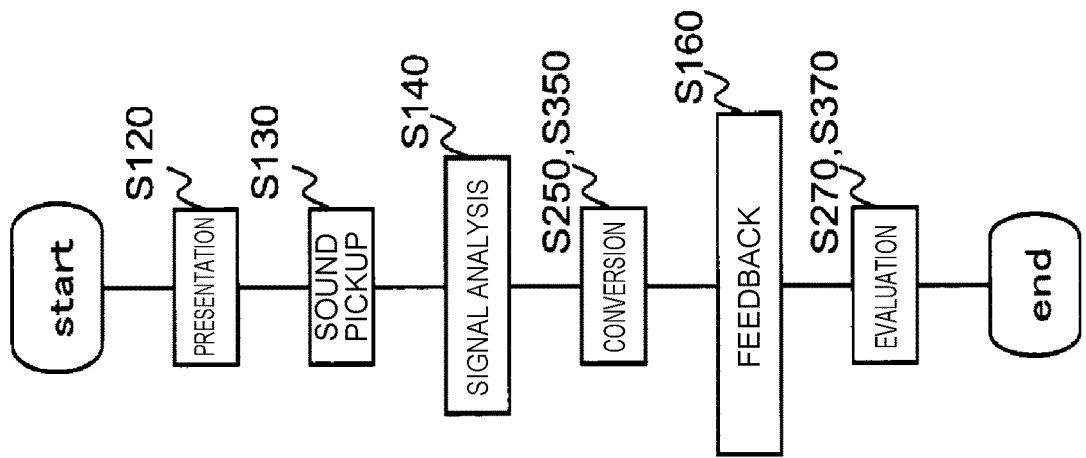
FIG. 6 shows an example of a flow of the evaluation device according to the first and second embodiments.

FIG. 5 shows a functional block diagram of the evaluation device according to the first embodiment and FIG. 6 shows its processing flow.

The evaluation device 200 includes a control unit 210, a presentation unit 120, a sound pickup unit 130, a signal analysis unit 140, a storage unit 141, a conversion unit 250, a feedback unit 160, and an evaluation unit 270. It is described below focusing on differences from FIG. 1.

The evaluation device 200 presents an utterance content that the subject should utter to the subject via the presentation unit 120. Next, the evaluation device 200 picks up speech sound uttered by the subject via the sound pickup unit 130, feeds back the picked-up speech signal to the subject via the feedback unit 160 with or without conversion, determines an evaluation based on an amount of change in the pickup formant frequencies, and outputs the evaluation. The subject produces an utterance corresponding to the presented utterance content while listening to the speech sound being fed back.

The individual components are described below.

[Control Unit 210]

Operation of the control unit 210 is basically the same as that of the experimental device 100 discussed above.

For example, the control unit 210 outputs control signals to the presentation unit 120 and the sound pickup unit 130 such that an utterance content that the subject should utter is determined and the utterance content is presented by the presentation unit 120 and speech sound uttered by the subject is picked up by the sound pickup unit 130. The control unit 210 also determines what kind of conversion is to be performed at the conversion unit 250 and outputs indication information indicating the determined content to the conversion unit 250.

The presentation unit 120, the sound pickup unit 130 and the conversion unit 250 are repeatedly operated while changing the indication information at the control unit 210 so as to acquire pickup formant frequencies which are produced by the signal analysis unit 140 via analysis of the subject's speech sound which is picked by the sound pickup unit 130 when speech sound converted by the conversion unit 250 based on at least the four kinds of indication information shown below is fed back from the feedback unit 160. The signal analysis unit 140 and the feedback unit 160 repeat processing on input speech signals. It is assumed that the utterance content the subject is made to utter (a phoneme or sentence presented to the presentation unit 120) is common to the four kinds of indication information below.

(1) Applying a lowpass filter with the cutoff frequency Fc being a first predetermined value equal to or lower than X Hz without changing the feedback formant frequencies;
(2) applying a lowpass filter with the cutoff frequency Fc being the first predetermined value equal to or lower than X Hz to a speech signal with the feedback formant frequencies F1 and F2 changed;
(3) applying a lowpass filter with the cutoff frequency Fc being a second predetermined value greater than X Hz without changing the feedback formant frequencies; and
(4) applying a lowpass filter with the cutoff frequency Fc being the second predetermined value greater than X Hz to a speech signal with the feedback formant frequencies F1 and F2 changed.

As mentioned above, there is a positive correlation between the magnitude of variations in the compensatory response when information in the high frequency bands is removed and the ability to recognize voice identity. In this embodiment, information in frequency bands higher than the first predetermined value is used as information in high frequency bands, and an appropriate value that creates a positive correlation is set as the first predetermined value. The second predetermined value is set to a sufficiently large value that does not create a positive correlation even if information in frequency bands higher than the second predetermined value is removed. The second predetermined value automatically becomes a value greater than the first predetermined value. X Hz is set to an appropriate value that separates a possible range of the first predetermined value and a possible range of the second predetermined value. In this embodiment, with X Hz=3 kHz, the first predetermined value is 3 kHz and the second predetermined value is 8 kHz. By setting the first predetermined value to 3 kHz, voice identity is removed while leaving phonemic properties of speech sound.

The pickup formant frequencies F1 and F2 of the subject after an auditory feedback with the feedback formant frequencies changed for at least two kinds of different cutoff frequencies, respectively, and the pickup formant frequencies F1 and F2 of the subject after an auditory feedback without change of the feedback formant frequencies are acquired. In doing so, the first predetermined value equal to or lower than X Hz is used as one of the two kinds of different cutoff frequencies and the second predetermined value greater than X Hz is used as the other.

Also, the direction and magnitude of change in the feedback formant frequencies F1 and F2 in (2) and (4) are assumed to be the same. The direction and magnitude of change in the feedback formant frequencies F1 and F2 are appropriately set to an extent that the subject can recognize it as speech sound when fed back and a compensatory response can be detected. That is, the direction and magnitude of change in the feedback formant frequencies F1 and F2 are set avoiding such a great value that it can no longer be perceived as speech sound or too great or too small a value for a compensatory response to be detected.

Signals for the cutoff frequency being the second predetermined value in (3) and (4) are assumed to include speech signals with the second predetermined value being sufficiently large, that is, without performing cutoff. Not performing cutoff means including all frequencies.

[Conversion Unit 250]

The conversion unit 250 takes as input a speech signal in frequency domain and indication information from the control unit 210, converts the speech signal in frequency domain based on the indication information (S250), and outputs it to the feedback unit 160. For example, the conversion unit 250 applies a lowpass filter with the cutoff frequency being the first predetermined value or the second predetermined value with or without change of the feedback formant frequencies of the speech signal in frequency domain based on indication information corresponding to one of (1) to (4) above, and converts the speech signal in frequency domain.

[Evaluation Unit 270]

The evaluation unit 270 takes indication information as input and retrieves the pickup formant frequencies corresponding to the indication information from the storage unit 141. The evaluation unit 270 calculates compensatory response vectors using the following two pickup formant frequencies. A first pickup formant frequency is the pickup formant frequency of a speech signal acquired by picking up an utterance made by the subject while feeding back a speech signal that has been converted with change of the feedback formant frequencies to the subject. A second pickup formant frequency is the pickup formant frequency of a speech signal acquired by picking up an utterance made by the subject while feeding back a speech signal that has been converted without change of the feedback formant frequencies to the subject. The evaluation unit 270 determines an evaluation based on the compensatory response vector for each cutoff frequency (S270), and outputs it. Here, the pickup formant frequencies corresponding to indication information can be retrieved from the storage unit 141 as follows, for example. In the storage unit 141, the first formant frequency F1 and the second formant frequency F2 (pickup formant frequencies) are stored in association with the times of pickup of speech signals. Then, the first formant frequency and the second formant frequency that are stored in association with the information corresponding to the condition of (1) above and its time of input in the storage unit 141 are the "pickup formant frequencies of a speech signal acquired by picking up an utterance made by the subject while feeding back a speech signal that has been converted without change of the feedback formant frequencies to the subject" for the cutoff frequency of the first predetermined value. Likewise, the first formant frequency and the second formant frequency that are stored in association with the information corresponding to the condition of (2) above and its time of input are the "pickup formant frequencies of a speech signal acquired by picking up an utterance made by the subject while feeding back a speech signal that has been converted with change of the feedback formant frequencies to the subject", for the cutoff frequency of the first predetermined value. In short, pickup formant frequencies that were observed under each of the conditions (1) to (4) above can be retrieved based on indication information and its time of input by retrieving the formant frequencies associated with them from the storage unit 141. For example, the time of input of indication information may be acquired from an internal clock, an NTP server or the like when the evaluation unit 270 accepts the indication information.

For example, the evaluation unit 270 calculates a first compensatory response vector for the cutoff frequency of the first predetermined value using (1) and (2), and calculates a second compensatory response vector for the cutoff frequency of the second predetermined value using (3) and (4). For example, with the horizontal axis being the amount of change in the formant frequency F1 and the vertical axis being the amount of change in formant frequency F2, the evaluation unit 270 calculates a vector having these two amounts of change as elements as the first compensatory response vector. The amount of change in the formant frequency F1 is the difference between a pickup formant frequency F1 that is extracted from the subject's utterance upon a feedback under the condition (1) of not changing the feedback formant frequencies, and a pickup formant frequency F1 that is extracted from the subject's utterance upon a feedback under the condition (2) of changing the feedback formant frequencies. The amount of change in the formant frequency F2 is the difference between a pickup formant frequency F2 that is extracted from the subject's utterance upon a feedback under the condition (1) of not changing the feedback formant frequencies, and a pickup formant frequency F2 that is extracted from the subject's utterance upon a feedback under the condition (2) of changing the feedback formant frequencies. In a similar manner, the second compensatory response vector with the cutoff frequency being the second predetermined value is calculated.

The evaluation unit 270 may visualize the at least two kinds of compensatory response vectors thus determined in such a manner as illustrated in FIG. 3 and display them on a display unit, not shown. The display unit includes a display, for example, and only needs to visually show the compensatory response vectors to a user. In this case, the direction and magnitude of a compensatory response vector correspond to an evaluation. The greater the variations in the first compensatory response vector are relative to the correct compensatory response vector, it indicates higher ability to recognize voice identity. Here, the second compensatory response vector is used as the correct compensatory response vector.

Further, the evaluation unit 270 may calculate and output an index value indicating the level of ability to recognize voice identity using the two kinds of compensatory response vectors determined in the foregoing process. In this case, the index value corresponds to an evaluation.

The index value represents a magnitude of deviation of the first compensatory response vector with respect to the second compensatory response vector, and may be an angle between the second compensatory response vector and the first compensatory response vector, a magnitude of a normal from a straight line parallel to the second compensatory response vector toward the first compensatory response vector, and the like, for example. For example, using the second compensatory response vector as the correct compensatory response vector $\vec{A}=(a_1, a_2)$ and using the first compensatory response vector as the compensatory response vector $\vec{F}=(F1, F2)$, the length magnitude $|\vec{P}|$ of the orthogonal projection vector $\vec{P}=(p1, p2)$ of the compensatory response vector $\vec{F}$ onto the correct compensatory response vector $\vec{A}$, and the magnitude $|\vec{O}|$ of the normal vector $\vec{O}=(o_1, o_2)$ are computed by the expression below, for example.

$$|\vec{O}| = \sqrt{|\vec{F}|^2 - |\vec{P}|^2} = \sqrt{\left(\hat{F}_1^2 + \hat{F}_2^2\right) - \left(\frac{\hat{F}_1 a_1 + \hat{F}_2 a_2}{\sqrt{a_1^2 + a_2^2}}\right)^2} \quad \text{[Math. 3]}$$

The greater the values of these index values, it indicates higher ability to recognize voice identity.

<Effects>

With the arrangement described above, the subject's perception characteristics can be evaluated by making use of the relation that holds between the cutoff frequency and the compensatory response of an utterance observed.

<Variants>

While the embodiment above described the feedback formant frequencies that are changed in (2) and (4) above as being the first formant frequency F1 and the second formant frequency F2, the feedback formant frequencies to be changed may be one formant frequency or three or more formant frequencies as long as compensatory responses can be detected. Also, they may be formant frequencies except the first formant frequency F1 and the second formant frequency F2.

Further, while the embodiment above uses two cutoff frequencies (the first predetermined value and the second predetermined value), three or more cutoff frequencies may be used.

Second Embodiment

A second embodiment is described focusing on differences from the first embodiment.

In the first embodiment, auditory feedback is made with change of the feedback formant frequencies, and the compensatory responses of the pickup formant frequencies are calculated for evaluation of the perception characteristics of the subject. On the other hand, it is known that a certain degree of change is observed in utterance generation of the subject only with removal of high frequency components without changing the feedback formant frequencies. For example, from Non-Patent Literature 1, it is known that a person can learn to make clear utterances with feedback of lowpass-filtered speech sound.

Non-Patent Literature 1 only discloses correlation with the clearness of a person's utterance and does not imply correlation between the level of ability to recognize voice identity and the cutoff frequency. Also, because the cutoff frequency is as low as 2 kHz or less, not only voice identity but phonemic properties of speech sound would be lost. However, comprehensively considering the known findings of Non-Patent Literature 1 and the new findings from the aforementioned experiment, it seems that correlation holds between change in the pickup formant frequencies that occurs when speech sound with or without removal of high frequency components without changing the feedback formant frequencies is fed back to the subject, and the level of ability to recognize voice identity.

Accordingly, the second embodiment describes an evaluation device that evaluates the subject's ability to recognize voice identity based on change in the pickup formant frequencies with each cutoff frequency, instead of the compensatory response vector for each cutoff frequency.

The evaluation device of the second embodiment is of the same configuration as the first embodiment. In the following, the second embodiment is described focusing differences from the first embodiment with reference to FIGS. 5 and 6.

An evaluation device 300 includes a control unit 310, a presentation unit 120, a sound pickup unit 130, a signal analysis unit 140, a storage unit 141, a conversion unit 350, a feedback unit 160, and an evaluation unit 370.

The evaluation device 300 presents an utterance content that should be uttered by a subject to the subject via the presentation unit 120, picks up speech sound uttered by the subject via the sound pickup unit 130, feeds back the picked-up speech signal to the subject via the feedback unit 160 with or without conversion, determines an evaluation based on the amount of change in the pickup formant frequencies and outputs it. The subject produces an utterance corresponding to the presented utterance content while listening to the speech sound being fed back.

The individual components are described below.

[Control Unit 310]

For example, the control unit 310 outputs control signals to the presentation unit 120 and the sound pickup unit 130 such that an utterance content that the subject should utter is determined and the utterance content is presented by the presentation unit 120 and speech sound uttered by the subject is picked up by the sound pickup unit 130. The control unit 310 also determines what kind of conversion is to be performed in the conversion unit 350 and outputs indication information indicating the determined content to the conversion unit 350.

In the first embodiment, information for changing the feedback formant frequencies is included in indication information, whereas in the second embodiment, information for changing the feedback formant frequencies is not included in indication information. Only cutoff frequencies are given as indication information. That is, the pickup formant frequencies F1 and F2 of the subject upon a feedback of speech sound generated by removing the high frequency components of the subject's speech sound based on at least two kinds of different cutoff frequencies are acquired. Here, at least two kinds of cutoff frequencies are included: the first predetermined value equal to or lower than X Hz and the second predetermined value greater than X Hz.

[Conversion Unit 350]

The conversion unit 350 takes as input a speech signal in frequency domain and the indication information from the control unit 310, converts the speech signal in frequency domain based on the indication information (S350), and outputs it to the feedback unit 160. For example, the conversion unit 350 applies a lowpass filter with the cutoff frequency being the first predetermined value or the second predetermined value to the speech signal in frequency domain, and converts the speech signal in frequency domain.

Since in this embodiment indication information does not include a flag indicating whether to convert feedback formant frequencies or not, the conversion unit 350 generates a speech signal with high frequency components removed via a lowpass filter that removes components equal to or higher than a predetermined cutoff frequency of the speech signal picked up by the sound pickup unit 130 based on the value of the cutoff frequency included in the indication information, and outputs it to the feedback unit 160. That is, in this embodiment, processing of removing high frequency components from a speech signal in frequency domain is called conversion.

[Evaluation Unit 370]

The evaluation unit 370 takes indication information as input, and retrieves formant frequencies corresponding to the indication information from the storage unit 141. The evaluation unit 370 then determines the difference between the pickup formant frequency F1, F2 when the first predetermined value is applied as the cutoff frequency at the conversion unit 350 and the pickup formant frequency F1, F2 when the second predetermined value is applied as the cutoff frequency as an index value indicating the level of ability to recognize voice identity (S370), and outputs the index value as an evaluation.

For example, the evaluation device presents an utterance content that the subject should utter to the subject via the presentation unit 120 for each one sentence. Here, which cutoff frequency is to apply is determined for each one sentence. The subject produces speech sound corresponding to one sentence and it is fed back to the subject via the feedback unit 160. The pickup formant frequency F1, F2 and corresponding indication information are stored in the storage unit 141, and the evaluation unit 370 calculates the difference between the pickup formant frequency F1, F2 when the first predetermined value is applied as the cutoff frequency and the pickup formant frequency F1, F2 when the second predetermined value is applied as the cutoff frequency based on the indication information. Then, the evaluation unit 370 determines the calculated difference as an index value indicating the level of ability to recognize voice identity and outputs it as an evaluation. For the values of F1, F2 here, representative values are used respectively. The representative values can be statistics such as averages, medians, and modes. The difference between a representative value of the pickup formant frequency F1,F2 when the first predetermined value is applied as the cutoff frequency and a representative value of the pickup formant frequency F1,F2 when the second predetermined value is applied as the cutoff frequency is, in fact, the distance between the pair of the pickup formant frequency F1,F2 when the first predetermined value is applied as the cutoff frequency and the pair of the pickup formant frequency F1,F2 when the second predetermined value is applied as the cutoff frequency.

As with the first embodiment, it can be used as an index value which indicates higher ability to recognize voice identity as the value of the index value is greater.

<Effect>

With such an arrangement, similar effects to the first embodiment can be achieved.

<Variant>

A variant is described focusing on differences from the second embodiment.

In this variant, the subject further assesses "whether it is the speech sound he/she uttered" for fed-back speech sound that the subject hears during utterance, and inputs a result of assessment (a score) to the evaluation device 200. For example, five-grade evaluation from 1 to 5 is made and a higher score means being closer to the subject's own speech sound. Any means by which voice identity can be assessed may be used aside from five grades.

The evaluation device 300 determines a second evaluation based on an input score in addition to the evaluation determined in the second embodiment and outputs them.

The evaluation unit 370 performs the following process in addition to the process described in the second embodiment.

The evaluation unit 370 takes as input indication information and scores assessed by the subject, determines the difference between a score when the first predetermined value is applied as the cutoff frequency at the conversion unit 350 and a score when the second predetermined value is applied as the cutoff frequency as an index value indicating the level of ability to recognize voice identity (S370), and outputs the index value as the second evaluation.

For example, the evaluation device presents an utterance content that the subject should utter to the subject via the presentation unit 120 for each one sentence. Here, which cutoff frequency is to apply is determined for each one sentence. The subject produces speech sound corresponding to one sentence and it is fed back to the subject via the feedback unit 160. After the subject has finished uttering one sentence, the subject is asked to assess the corresponding speech sound fed back. The subject assesses "whether it is the speech sound he/she uttered" after listening to the fed-back speech signal and inputs it via an input unit, not shown. Scores and the corresponding indication information are stored in a storage unit, not shown, and the difference between the representative value of scores when the first predetermined value is applied as the cutoff frequency and the representative value of scores when the second predetermined value is applied as the cutoff frequency is determined as an index value indicating the level of ability to recognize voice identity and, it is output as an evaluation. The representative values can be statistics such as averages, medians, and modes.

As with the second embodiment, it can be used as an index value that indicates higher ability to recognize voice identity as the value of the index value (the second evaluation) is greater.

This variant and the first embodiment may be combined.

Third Embodiment

A third embodiment describes a training device for training the subject's utterance.

A phenomenon of utterances becoming difficult to hear is often seen in elderly people. It is considered that a person develops difficulty in perceiving high frequencies as he/she gets older. As a result of having difficulty in perceiving high frequency components containing voice identity, he/she can no longer correctly produce compensatory responses of utterances, which creates a situation analogous to compensatory responses when the high frequency components are removed in the above-described experiment. Consequently, utterances are expressed as sounds different from ones in his/her younger years and others cannot hear it correctly.

Conversely, a person would be able to learn utterance that is easily heard even after he/she has reached old age by training utterance while listening to sound from which high frequency components containing much voice identity have been removed from his/her early years. The training device of the third embodiment is a training device for utterance training that enables clear utterance even after the subject has reached old age by making use of the findings from the above-described experiment.

Figure 7:
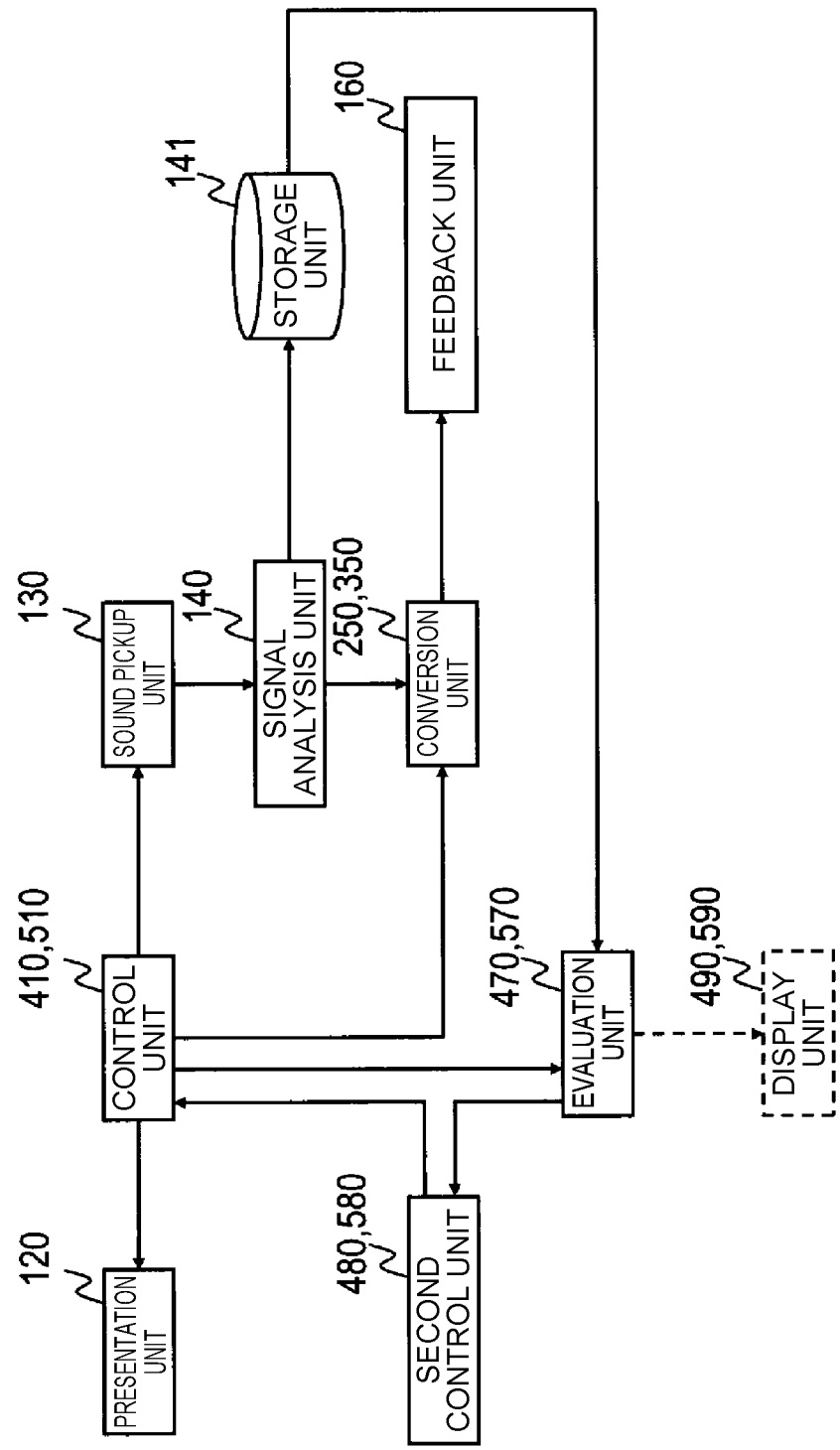
FIG. 7 is a functional block diagram of a training device according to third and fourth embodiments.
Figure 8:
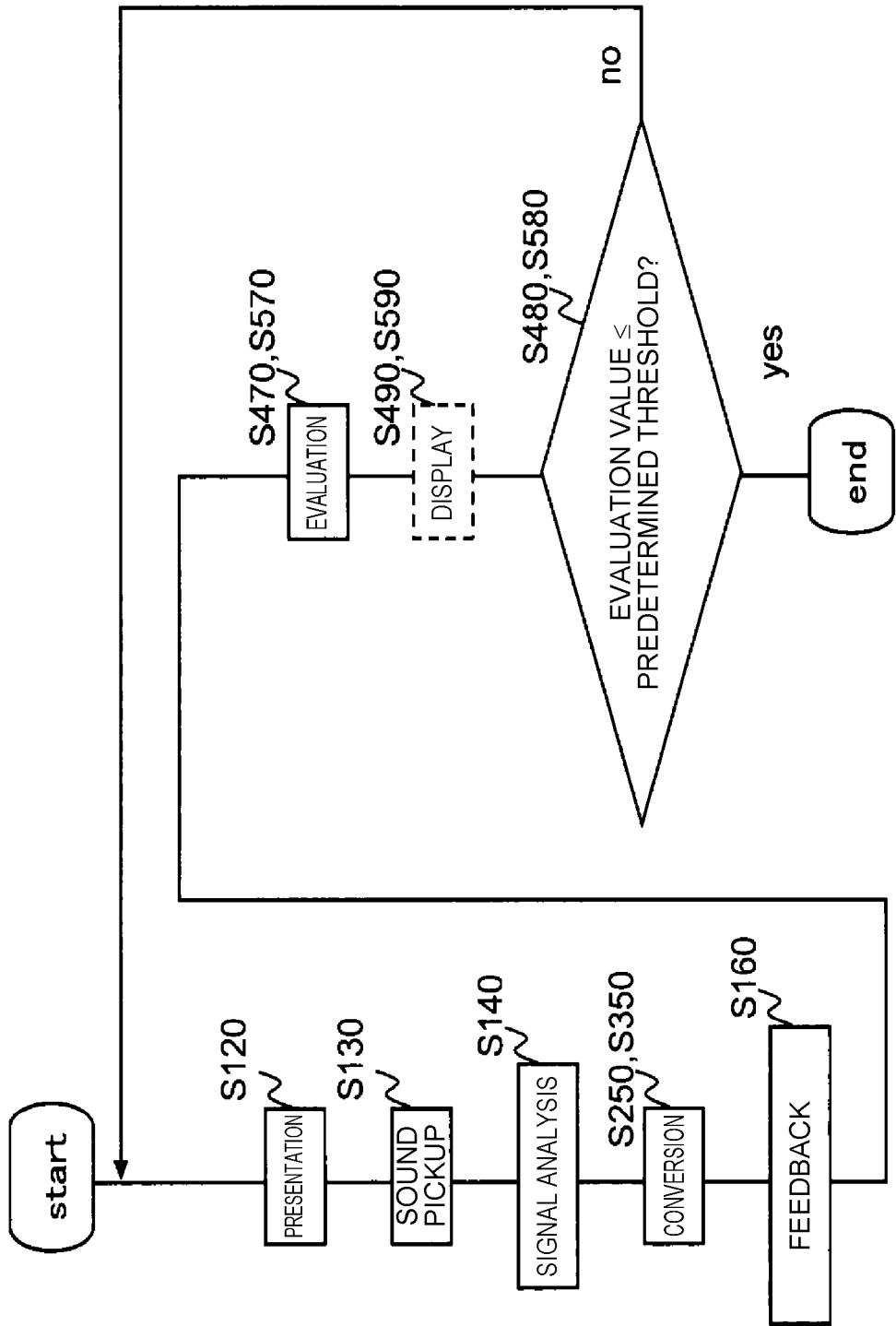
FIG. 8 shows an example of a flow of the training device according to the third and fourth embodiments.

FIG. 7 shows a functional block diagram of the training device according to the third embodiment and FIG. 8 shows an example of its processing flow. The third embodiment is described below focusing on differences from the first embodiment.

A training device 400 includes a control unit 410, a presentation unit 120, sound pickup unit 130, a signal analysis unit 140, a storage unit 141, a conversion unit 250, a feedback unit 160, an evaluation unit 470 and a second control unit 480. It is described below focusing on differences from FIG. 5.

The training device 400 presents an utterance content that the subject should utter to the subject via the presentation unit 120, picks up speech sound uttered by the subject via the sound pickup unit 130, and feeds back the picked-up speech signal to the subject via the feedback unit 160 with or without conversion, and conducts an utterance training based on the amount of change in the pickup formant frequencies. The subject produces an utterance corresponding to the presented utterance content while listening to the speech sound being fed back.

[Control Unit 410]

The control unit 410 corresponds to the control unit 210 of the first embodiment.

The control unit 410 takes as input a control instruction from the second control unit 480 to be discussed later, and outputs control signals to the presentation unit 120 and the sound pickup unit 130 such that an utterance content that the subject should utter is determined and presented by the presentation unit 120 and speech sound uttered by the subject is picked up by the sound pickup unit 130 in accordance with the control instruction. The control unit 410 also determines what kind of conversion is to be performed in the conversion unit 250 and outputs indication information indicating the determined content to the conversion unit 250.

The presentation unit 120, the sound pickup unit 130 and the conversion unit 250 are operated repeatedly while changing the indication information at the control unit 410 so as to acquire pickup formant frequencies which are produced by the signal analysis unit 140 via analysis of the subject's speech sound which is picked by the sound pickup unit 130 when a speech sound converted by the conversion unit 250 based on at least the two kinds of indication information (1) and (2) described in the first embodiment is fed back from the feedback unit 160. The signal analysis unit 140 and the feedback unit 160 repeat processing on input speech signals. It is assumed that the utterance content the subject is made to utter is common to the two kinds of indication information.

Here, the same utterance content is repeatedly presented to the presentation unit 120 and the subject is made to conduct an utterance training until it is determined that the magnitude of the orthogonal projection vector is above a predetermined threshold or the magnitude of the normal vector is below a predetermined threshold at the second control unit 480.

[Evaluation Unit 470]

The evaluation unit 470 takes indication information as input and retrieves the pickup formant frequencies corresponding to the indication information from the storage unit 141. The evaluation unit 470 calculates a compensatory response vector using the pickup formant frequencies of a speech signal acquired by picking up an utterance made by the subject while feeding back a speech signal that has been converted with change of the feedback formant frequencies to the subject, and the pickup formant frequencies of a speech signal acquired by picking up an utterance made by the subject while feeding back a speech signal that has been converted without change of the feedback formant frequencies to the subject. The evaluation unit 470 determines an evaluation based on the compensatory response vector and the correct compensatory response vector (S470), and outputs it. For example, since the storage unit 141 stores the first formant frequency F1 and the second formant frequency F2 (pickup formant frequencies) in association with the times of pickup of speech signals, the pickup formant frequencies calculated at the signal analysis unit 140 are retrieved using indication information and its time of input and based on the speech signals generated by picking up the subject's utterance via the sound pickup unit 130 when speech signals generated under each of the conditions (1) and (2) above are fed back via the feedback unit 160. From the pickup formant frequencies, a compensatory response vector is calculated. Calculation of a compensatory response vector is based on the computation scheme in the above-described experiment.

Further, the evaluation unit 470 calculates at least any one of the absolute value of the difference between the magnitude of the orthogonal projection vector relative to the compensatory response vector and the magnitude of the correct compensatory response vector, the magnitude of the normal vector relative to the compensatory response vector, and the sum of the absolute value of the difference between the magnitude of the orthogonal projection vector and the magnitude of the correct compensatory response vector, and the magnitude of the normal vector, and outputs it as an evaluation value to the second control unit 480. For example, the length magnitude $|\rightarrow P|$ of the orthogonal projection vector $\rightarrow P=(p1, p2)$ of the compensatory response vector $\rightarrow F=(F1, F2)$ onto the correct compensatory response vector $\rightarrow A=(a_1, a_2)$ calculated using (1) and (2) above, and the magnitude $|\rightarrow O|$ of the normal vector $\rightarrow O=(o_1, o_2)$ are computed by:

$$|\vec{O}| = \sqrt{|\vec{F}|^2 - |\vec{P}|^2} = \sqrt{\left(\hat{F}_1^2 + \hat{F}_2^2\right) - \left(\frac{\hat{F}_1 a_1 + \hat{F}_2 a_2}{\sqrt{a_1^2 + a_2^2}}\right)^2} \quad \text{[Math. 4]}$$

The correct compensatory response vector $\rightarrow A=(a_1, a_2)$ is a vector of the same magnitude in an opposite direction to the vector corresponding to the original perturbation.

The first embodiment utilized compensatory response vectors that are calculated using (3) and (4) above, in other words, compensatory responses vector that are obtained when a lowpass filter with the cutoff frequency Fc being the second predetermined value greater than X Hz is applied, as the correct compensatory response vector for evaluation of the perception characteristics of the subject. As opposed to this, the third embodiment utilizes a vector of the same magnitude in an opposite direction to the vector corresponding to the original perturbation as the correct compensatory response vector so that the subject can learn utterances that are easy to hear even if he/she develops difficulty to perceive high frequency components. It is also possible to give feedback under the conditions (3) and (4) above and determine the correct compensatory response vector; however, determining the correct compensatory response vector itself has no training effect, so acquisition is easier and training efficiency is better when a vector of the same magnitude in an opposite direction to the vector corresponding to the original perturbation is utilized.

[Second Control Unit 480]

The second control unit 480 takes as input an evaluation value determined by the evaluation unit 470 and determines whether to make the subject conduct an utterance training with the same utterance content repeatedly or not based on a relation of magnitude between the evaluation value and a predetermined threshold. For example, in a case where an evaluation value becomes lower the better the subject can make utterances with the same compensatory response as a desired compensatory response, it is determined whether the evaluation value has become equal to or lower than the predetermined threshold (S480). If it is greater than the predetermined threshold (no in S480), a control instruction is output to the control unit 410 so that the same utterance content is presented by the presentation unit 120 and the subject is made to conduct utterance training repeatedly.

When the evaluation value is equal to or lower than the predetermined threshold (yes in S480), the utterance training for the utterance content being presented by the presentation unit 120 is finished. In this case, the second control unit 480 may output a control instruction to the control unit 410 so as to switch to the next utterance content (a different phoneme, sentence, etc.) and continue training for a different utterance content, or may output a control instruction to the control unit 410 so as to end the utterance training.

For example, with the evaluation value being the absolute value of the difference between the magnitude of the orthogonal projection vector and the magnitude of the correct compensatory response vector, the subject is made to conduct utterance training repeatedly until the evaluation value becomes equal to or lower than the predetermined threshold. The evaluation value in this case can be said to be an evaluation value that assumes a lower value as the magnitude of the orthogonal projection vector is closer to the magnitude of the correct compensatory response vector. By this criterion, the subject will be made to conduct utterance training so that the magnitude of the orthogonal projection vector approaches the magnitude of the correct compensatory response vector.

Alternatively, the magnitude of the normal vector is used as the evaluation value and the subject is made to conduct utterance training repeatedly until the evaluation value becomes equal to or smaller than the predetermined threshold. The evaluation value in this case is an evaluation value that assumes a lower value as the magnitude of the normal vector is smaller. Then, the subject will be made to conduct utterance training repeatedly so that the magnitude of the normal vector approaches 0.

Alternatively, the sum of the absolute value of the difference between the magnitude of the orthogonal projection vector and the magnitude of the correct compensatory response vector and the magnitude of the normal vector may be used as the evaluation value, and the subject may be made to conduct utterance training repeatedly until the evaluation value becomes equal to or smaller than the predetermined threshold. In this case, the subject will be made to conduct utterance training so that the magnitude of the orthogonal projection vector approaches the magnitude of the correct compensatory response vector and that the magnitude of the normal approaches 0.

It is not necessary that the magnitude of the orthogonal projection vector become strictly the same magnitude as the correct compensatory response vector; it only has to become sufficiently large. It is also not necessary that the magnitude of the normal vector become strictly 0; it only has to approach 0. Thus, an ending condition is that "the absolute value of the difference between the magnitude of the orthogonal projection vector and the magnitude of the correct compensatory response vector is equal to or smaller than a predetermined threshold", or "the magnitude of the normal vector is equal to or smaller than a predetermined threshold", or "the sum of the absolute value of the difference between the magnitude of the orthogonal projection vector and the magnitude of the correct compensatory response vector, and the magnitude of the normal vector is equal to or smaller than a predetermined threshold." The larger a discrepancy relative to the desired compensatory response of the subject (the correct compensatory response) due to conversion of the feedback formant frequencies is, the absolute value of the difference between the magnitude of the orthogonal projection vector and the magnitude of the correct compensatory response vector will be greater, or the magnitude of the normal vector will be greater, or the sum of the absolute value of the difference between the magnitude of the orthogonal projection vector and the magnitude of the correct compensatory response vector and the magnitude of the normal vector will be greater. In other words, that the magnitude of the orthogonal projection vector approaches the magnitude of the correct compensatory response vector or that the magnitude of the normal vector approaches 0 means that the subject has become able to make utterances with the same compensatory response as the desired compensatory response (the compensatory response when a lowpass filter is not applied) even when speech sound to which a lowpass filter near X Hz has been applied is fed back. This is because the subject can be trained to produce the same utterances as when the subject was able to hear high-frequency sounds even after he/she has developed difficulty in hearing high-frequency sounds.

<Effects>

With such an arrangement, the subject's utterance can be trained by utilizing the relation that holds between the cutoff frequency and the compensatory response of an utterance observed.

Variants of the Third Embodiment

The training device of the third embodiment may further include a display unit 490 (indicated by broken line in FIG. 7) that visualizes and displays the absolute value of the difference between the magnitude of the orthogonal projection vector and the magnitude of the correct compensatory response vector, the magnitude of the normal vector, and/or the sum of the absolute value of the difference between the magnitude of the orthogonal projection vector and the magnitude of the correct compensatory response vector and the magnitude of the normal vector. The display unit 490 takes an evaluation value as input, and visualizes and displays it (indicated by broken line in FIG. 8, S490). This allows the subject to grasp the degree of discrepancy and make the next utterance, thus enabling efficient learning of stable utterance.

In visualization, the magnitude of the normal vector may be simply represented by a bar graph and the like as shown in FIG. 4 (the bar graph and the like may also indicate the absolute value of the difference between the magnitude of the orthogonal projection vector and the magnitude of the correct compensatory response vector, or the sum of the absolute value of the difference between the magnitude of the orthogonal projection vector and the magnitude of the correct compensatory response vector and the magnitude of the normal vector). Alternatively, with the horizontal axis being the pickup formant frequency F1 and the vertical axis being the pickup formant frequency F2 as in FIG. 9, the desired compensatory response vector (a vector of the same magnitude in an opposite direction to the vector corresponding to the original perturbation) shown by broken line in the figure, a compensatory response vector that is actually observed in response to feedback of the current utterance shown by double-dashed line in the figure, the orthogonal projection vector shown by solid line in the figure, and the normal vector shown by dot-dashed line in the figure may be presented. Here, assuming that the pair of the first and the second formant frequencies ($F_1$, $F_2$) of uttered speech sound (before formant conversion) measured from phonation of the subject is the origin and the pair of the first and the second formant frequencies ($-a_1$, $-a_2$) of formant-converted speech sound is the original perturbation, the desired compensatory response vector (denoted as "correct compensatory response vector" in FIG. 9) can be represented as ($a_1$, $a_2$).

Fourth Embodiment

A fourth embodiment is a training device for training the utterance of the subject as with the third embodiment, but differs in that it performs utterance training by applying the principle of the second embodiment (a method without feedback of formant-converted speech sound).

FIG. 7 shows a functional block diagram of the training device according to the fourth embodiment and FIG. 8 shows an example of its processing flow. The fourth embodiment is described below focusing on differences from the second embodiment.

A training device 500 includes a control unit 510, a presentation unit 120, a sound pickup unit 130, a signal analysis unit 140, a storage unit 141, a conversion unit 350, a feedback unit 160, an evaluation unit 570 and a second control unit 580. It is described below focusing on differences from FIG. 5.

The training device 500 presents an utterance content that a subject should utter to the subject via the presentation unit 120, picks up speech sound uttered by the subject via the sound pickup unit 130, feeds back the picked-up speech signal to the subject via the feedback unit 160 with or without conversion, and conducts utterance training based on an amount of change in the pickup formant frequencies. The subject produces an utterance corresponding to the presented utterance content while listening to the speech sound being fed back.

[Control Unit 510]

The control unit 510 corresponds to the control unit 310 in the second embodiment.

The control unit 510 takes as input a control instruction from the second control unit 580 to be discussed later, and outputs control signals to the presentation unit 120 and the sound pickup unit 130 according to the control instruction such that an utterance content that the subject should utter is determined and is presented by the presentation unit 120 and speech sound uttered by the subject is picked up by the sound pickup unit 130. The control unit 510 also determines what kind of conversion is to be performed at the conversion unit 350 and outputs indication information indicating the determined content to the conversion unit 350.

The presentation unit 120, the sound pickup unit 130 and the conversion unit 350 are repeatedly operated while changing indication information at the control unit 510 so as to acquire pickup formant frequencies which are produced by the signal analysis unit 140 via analysis of the subject's speech sound which is picked by the sound pickup unit 130 when speech sound converted by the conversion unit 350 based on at least the two kinds of indication information (1) and (3), described in the first embodiment, is fed back from the feedback unit 160. The signal analysis unit 140 and the feedback unit 160 repeat processing on input speech signals. It is assumed that the utterance content the subject is made to utter is common to the two kinds of indication information.

Here, the same utterance content is repeatedly presented by the presentation unit 120 and the subject is made to conduct utterance training until the evaluation value becomes equal to or smaller than a predetermined threshold at the second control unit 580.

[Evaluation Unit 570]

The evaluation unit 570 takes indication information as input, retrieves the pickup formant frequencies corresponding to the indication information from the storage unit 141 and calculates the following two pickup formant frequencies. A first pickup formant frequency is the pickup formant frequency of a speech signal acquired by picking up an utterance made by the subject while feeding back a speech signal that has been converted by applying the first predetermined value as the cutoff frequency to the subject. A second pickup formant frequency is the pickup formant frequency of a speech signal acquired by picking up an utterance made by the subject while feeding back a speech signal that has been converted by applying the second predetermined value as the cutoff frequency to the subject. The evaluation unit 570 calculates the degree of discrepancy (an error) of the two pickup formant frequencies (S570), and outputs it to the second control unit 580 as an evaluation value. For example, since the storage unit 141 stores the first formant frequency F1 and the second formant frequency F2 in association with the times of pickup of speech signals, the pickup formant frequencies calculated at the signal analysis unit 140 are retrieved using indication information and its time of input and based on the speech signals that are acquired by picking the subject's utterance via the sound pickup unit 130 when a speech signal generated under each of the conditions (1) and (3) above is fed back via the feedback unit 160. For example, the time of input of indication information may be acquired from an internal clock, an NTP server or the like when the evaluation unit 470 accepts the indication information.

The evaluation unit 570 calculates the degree of discrepancy (error) of the pickup formant frequency F1, F2 under the first condition with respect to the pickup formant frequency F1, F2 under the second condition, by using the formant frequencies corresponding to the condition (1), in other words, the pickup formant frequency F1, F2 of a speech signal for the subject's utterance when a speech signal to which a lowpass filter with the cutoff frequency being the first predetermined value equal to or lower than X Hz has been applied is fed back (hereinafter, referred to as the formant frequency F1, F2 under the first condition), and the formant frequencies corresponding to the condition (3), in other words, the pickup formant frequency F1, F2 of a speech signal for the subject's utterance when a speech signal to which a lowpass filter with the cutoff frequency being the predetermined second value greater than X Hz has been applied is fed back (hereinafter, referred to as the formant frequency F1, F2 under the second condition), and outputs it to the second control unit 580 as an evaluation value.

[Second Control Unit 580]

The second control unit 580 takes as input the evaluation value (error) determined by the evaluation unit 570 and determines whether to make the subject conduct utterance training with the same utterance content repeatedly based on a relation of magnitude between the evaluation value and a predetermined threshold. For example, in a case where the evaluation value becomes smaller the better the subject can make utterances with the same compensatory response as the desired compensatory response, it is determined whether the evaluation value has become equal to or lower than the predetermined threshold (S580). If it is greater than the predetermined threshold (no in S580), a control instruction is output to the control unit 510 so that the same utterance content is presented by the presentation unit 120 and the subject is made to conduct utterance training repeatedly.

When the evaluation value (similarity) is equal to or lower than the predetermined threshold (yes in S580), the utterance training for the utterance content being presented by the presentation unit 120 is finished. In this case, the second control unit 580 may output a control instruction to the control unit 510 so as to switch to the next utterance content (a different phoneme, sentence, etc.) and continue training for a different utterance content, or may output a control instruction to the control unit 510 so as to end the utterance training.

The training device of the fourth embodiment intends to make the subject repeatedly train utterance so that pickup formant frequencies that are contained in the subject's utterance when a lowpass filter with the cutoff frequency being the first predetermined value equal to or lower than X Hz is applied approaches the pickup formant frequencies that are contained in the subject's utterance when a lowpass filter with the cutoff frequency being the second predetermined value equal to or greater than X Hz is applied (or when a lowpass filter is not applied). This is because the subject can be trained to produce the same utterances as when the subject was able to hear high-frequency sounds even after he/she has developed difficulty in hearing high-frequency sounds.

<Effect>

With such an arrangement, similar effects to the third embodiment can be achieved.

Variant of the Fourth Embodiment

The training device of the fourth embodiment may further include a display unit 590 that visualizes and displays the pickup formant frequency F1, F2 under the first condition and the pickup formant frequency F1, F2 under the second condition (indicated by broken line in FIG. 7). The display unit 590 takes an evaluation value as input, and visualizes and displays it (indicated by broken line in FIG. 8, S590). This allows the subject to grasp the degree of discrepancy and make the next utterance, thus enabling efficient learning of stable utterance.

<Other Variants>

The present invention is not limited to the embodiments and variants described above. For example, the various processing discussed above may be executed not only in a temporal sequence in concert with description, but may be executed in parallel or individually depending on processing ability of a device that executes the processing or any necessity. Any other modifications are possible without departing from the scope of the present invention.

<Programs and Recording Media>

The various processing functions on the devices described in the embodiments and variants above may be implemented by a computer. In that case, processing actions of functions to be provided by each device is written by a program. The program is then executed by the computer to cause the various processing function of the device described above is implemented on the computer.

The program describing the processing actions can be recorded on a computer-readable recording medium. The computer-readable recording medium can be any kind of media such as a magnetic recording device, optical disk, a magneto-optical recording medium, and semiconductor memory.

The program is distributed by selling, transferring, or lending of a removable recording medium with the program recorded thereon, such as a DVD and a CD-ROM, for example. Further, the program may be stored in a storage device of a server computer and the program may be transferred from the server computer to other computers over a network, thereby distributing the program.

A computer that executes such a program first stores the program recorded on the removable recording medium or the program transferred from the server computer in its storage unit once. Then, in execution of processing, the computer reads the program stored in its storage unit and executes processing in accordance with the read program. As another embodiment of the program, a computer may directly read the program from a removable recording medium and execute processing according to the program. Furthermore, the computer may execute processing according to a received program every time a program is transferred to the computer from the server computer. The processing described above may also be executed by a so-called ASP (Application Service Provider) service, which implements processing functions only via execution instructions for a program and acquisition of results without transferring the program from the server computer to the computer. Programs shall encompass any information that is used for processing by an electronic computer and comparable to a program (such as data with a nature defining computer processing though not a direct command on a computer).

Although the present devices are described as being implemented by execution of a predetermined program on a computer, at least some of their processing actions may be embodied in hardware.

The invention claimed is:

1. An evaluation device comprising:
a signal analyzer configured to analyze a picked-up speech signal, and determine a first formant frequency and a second formant frequency;
a convertor configured to apply a lowpass filter with a cutoff frequency being a first predetermined value or a second predetermined value greater than the first predetermined value with or without change of feedback formant frequencies which are formant frequencies of the picked-up speech signal, and convert the picked-up speech signal;
a feedback feeder configured to feed back the converted speech signal to a subject; and
an evaluator configured to determine a compensatory response vector by using pickup formant frequencies which are formant frequencies of a speech signal acquired by picking up an utterance made by the subject while feeding back a speech signal that has been converted with change of the feedback formant frequencies to the subject, and pickup formant frequencies which are formant frequencies of a speech signal acquired by picking up an utterance made by the subject while feeding back a speech signal that has been converted without change of the feedback formant frequencies to the subject, and determine an evaluation based on a compensatory response vector for each cutoff frequency.

2. The evaluation device according to claim 1, wherein the cutoff frequency is between 3 kHz and 8 kHz.

3. The evaluation device according to claim 1, further comprising:
a display configured to display a combination of the first formant frequency and the second formant frequency.

4. An evaluation method comprising:
analyzing, by a signal analyzer, a picked-up speech signal and determining a first formant frequency and a second formant frequency;
applying, by a convertor, a lowpass filter with a cutoff frequency being a first predetermined value or a second predetermined value greater than the first predetermined value with or without change of feedback formant frequencies which are formant frequencies of the picked-up speech signal;
converting, by the convertor, the picked-up speech signal;
feeding back, by a feedback feeder, the converted speech signal to a subject; and
determining, by an evaluator, a compensatory response vector by using pickup formant frequencies which are formant frequencies of a speech signal acquired by picking up an utterance made by the subject while feeding back a speech signal that has been converted with change of the feedback formant frequencies to the subject, and pickup formant frequencies which are formant frequencies of a speech signal acquired by picking up an utterance made by the subject while feeding back a speech signal that has been converted without change of the feedback formant frequencies to the subject; and
determining, by the evaluator, an evaluation based on a compensatory response vector for each cutoff frequency.

5. The evaluation method according to claim 4, wherein the cutoff frequency is between 3 kHz and 8 kHz.

6. The evaluation method according to claim 4, further comprising:
displaying a combination of the first formant frequency and the second formant frequency.

7. A training method comprising:
analyzing, by an analyzer, a picked-up speech signal and determining a first formant frequency and a second formant frequency;
applying, by a convertor, a lowpass filter with a cutoff frequency being a first predetermined value with or without change of feedback formant frequencies which are formant frequencies of the picked-up speech signal, and converting the picked-up speech signal;

feeding back, by a feed back feeder, the converted speech signal to a subject;

determining, by an evaluator, a compensatory response vector by using pickup formant frequencies which are formant frequencies of a speech signal acquired by picking up an utterance made by the subject while feeding back a speech signal that has been converted with change of the feedback formant frequencies to the subject, and pickup formant frequencies which are formant frequencies of a speech signal acquired by picking up an utterance made by the subject while feeding back a speech signal that has been converted without change of the feedback formant frequencies to the subject; and determining, by the evaluator, an evaluation based on the compensatory response vector and a correct compensatory response vector, wherein whether to make the subject conduct utterance training with a same utterance content repeatedly or not is determined based on a relation of magnitude between the evaluation and a predetermined threshold.

8. The training method according to claim 7, wherein the cutoff frequency is between 3 kHz and 8 kHz.

9. The training method according to claim 7, further comprising:

displaying a combination of the first formant frequency and the second formant frequency.

* * * * *